US011933517B2

(12) United States Patent
Dillinger et al.

(10) Patent No.: US 11,933,517 B2
(45) Date of Patent: Mar. 19, 2024

(54) BUTTERFLY FLAP REDUCTION GEAR

(71) Applicant: Gruner AG, Wehingen (DE)

(72) Inventors: Kevin Dillinger, Spaichingen (DE); Wolfgang Spreitzer, Wehingen (DE)

(73) Assignee: Gruner AG, Wehingen (DE)

( * ) Notice: Subject to any disclaimer, the term of this patent is extended or adjusted under 35 U.S.C. 154(b) by 270 days.

(21) Appl. No.: 17/446,975

(22) Filed: Sep. 6, 2021

(65) Prior Publication Data
US 2021/0396424 A1 Dec. 23, 2021

Related U.S. Application Data

(63) Continuation of application No. PCT/EP2019/085504, filed on Dec. 17, 2019.

(30) Foreign Application Priority Data

Mar. 7, 2019 (EP) .................................... 19161214

(51) Int. Cl.
*F24F 13/14* (2006.01)
*F24D 19/10* (2006.01)
*F24F 11/35* (2018.01)

(52) U.S. Cl.
CPC ...... *F24F 13/1426* (2013.01); *F24D 19/1015* (2013.01); *F24F 11/35* (2018.01);
(Continued)

(58) Field of Classification Search
CPC .................. F24F 11/35; F24F 13/1426; F24F 2013/1433; F24F 2013/1466;
(Continued)

(56) References Cited

U.S. PATENT DOCUMENTS 4,896,850 A * 1/1990 Carmes ................... B61L 5/107
246/401
5,156,576 A * 10/1992 Johnson ................... F16H 57/02
74/606 R
(Continued)

FOREIGN PATENT DOCUMENTS

CN       1822476 A  *  8/2006  .......... H02K 7/1166
CN       1898474 A        1/2007
(Continued)

OTHER PUBLICATIONS

Wang, Jingmei, "Rock Drilling Machinery & Pneumatic Tools", Issue No. 2, May 1, 1996.

*Primary Examiner* — Edelmira Bosques
*Assistant Examiner* — Frances F. Hamilton
(74) *Attorney, Agent, or Firm* — Orbit IP

(57) ABSTRACT

A regulating flap reduction gear for an electrically driven regulating flap for regulating a gas or liquid volume flow includes two parallel bearing plates between which gear parts are rotatably arranged. A plurality of spacers keep the two bearing plates at a distance from one another. The plurality of spacers are designed as tabs of one, first bearing plate, which are bent by 90° from the plane of the first bearing plate and have at least one lateral projection. The tabs are inserted with their free tab ends into plug-in openings of the other second bearing plate until their at least one lateral projection rests against the second bearing plate.

12 Claims, 2 Drawing Sheets

(52) U.S. Cl.
CPC .............. *F24F 2013/1433* (2013.01); *F24F 2013/1446* (2013.01)

(58) Field of Classification Search
CPC ......... F24D 19/1015; F24D 2220/0271; F26H 2057/02095; F26H 57/021; F02D 9/107; F02D 9/1065
USPC ............................. 251/129.11, 129.12, 286
See application file for complete search history.

(56) References Cited

U.S. PATENT DOCUMENTS

| | | | |
|---|---|---|---|
| 6,073,907 A * | 6/2000 | Schreiner, Jr. | F16K 31/043 251/291 |
| 6,155,533 A * | 12/2000 | Semeyn | F02D 11/107 123/399 |
| 6,777,840 B2 * | 8/2004 | Giacomini | F16K 31/047 137/625.25 |
| 7,568,868 B2 | 8/2009 | Motsch et al. | |
| 9,704,683 B2 | 7/2017 | Schmelz | |
| 2004/0000655 A1 * | 1/2004 | Noritake | F24F 13/1426 251/248 |
| 2004/0149261 A1 * | 8/2004 | Hildebrandt | F02D 11/10 123/399 |
| 2005/0109142 A1 | 5/2005 | Schunke et al. | |
| 2006/0060015 A1 * | 3/2006 | Hofschulte | B60N 2/233 74/89.14 |
| 2009/0108219 A1 * | 4/2009 | Schreiner | F16K 31/046 251/129.1 |
| 2009/0149124 A1 | 6/2009 | Stevenson et al. | |
| 2011/0152019 A1 | 6/2011 | Gantner et al. | |
| 2015/0033779 A1 | 2/2015 | Seggerman | |
| 2015/0075311 A1 | 3/2015 | Kanzaki | |
| 2016/0238106 A1 | 8/2016 | Park et al. | |
| 2017/0065839 A1 * | 3/2017 | Weber | F16K 31/055 |
| 2017/0146256 A1 | 5/2017 | Alexander et al. | |
| 2017/0159793 A1 * | 6/2017 | Schorpp | H02K 7/081 |
| 2019/0207475 A1 * | 7/2019 | Uematsu | H02K 5/1732 |

FOREIGN PATENT DOCUMENTS

| | | |
|---|---|---|
| CN | 101203396 A | 6/2008 |
| CN | 102027266 A | 4/2011 |
| CN | 105387134 A | 3/2016 |
| CN | 105408976 A | 3/2016 |
| CN | 106276076 A | 1/2017 |
| CN | 108758844 A | 11/2018 |
| DE | 43 37 413 C1 | 3/1995 |
| DE | 102011009061 A1 | 7/2012 |
| DE | 10 2014 226 549 A1 | 6/2016 |
| EP | 2 876 339 A2 | 5/2015 |
| EP | 3 203 111 A1 | 8/2017 |
| JP | 62126840 A * | 6/1987 |
| JP | S62 126840 A | 6/1987 |
| JP | 2004-076794 A | 3/2004 |
| KR | 10 2014 0077365 A | 6/2014 |
| WO | 2005/090831 A1 | 9/2005 |

\* cited by examiner

BUTTERFLY FLAP REDUCTION GEAR

CROSS-REFERENCE TO RELATED APPLICATIONS

This continuation application claims priority to PCT/EP2019/085504 filed on Dec. 17, 2019 which has published as WO 2020/177914 A1 and also the European patent application number 19 161 214.2 filed Mar. 7, 2019, the entire contents of which are fully incorporated herein with these references.

DESCRIPTION

Field of the Invention

The present invention relates to a regulating flap reduction gear for an electrically driven regulating flap for regulating a gas or liquid volume flow, in particular in the field of heating, ventilation, air conditioning, fire protection or smoke protection comprising two parallel bearing plates between which gear parts are rotatably arranged, and a plurality of spacers which keep the two bearing plates at a distance from one another.

Background of the Invention

In known regulating flap reduction gears, gear parts of the reduction gear are arranged in a rotatable manner between two parallel bearing plates. The two bearing plates are screwed to each other by means of threaded bolts which simultaneously also serve as spacers between the two bearing plates.

WO 2005/090831 A1 describes a reduction gear of an electric actuator for regulating a gas or liquid volume flow. The reduction gear is realized in two housing modules such that the output can be combined with different drive motors.

In contrast thereto, it is the object of the present invention to further simplify the construction of a regulating flap reduction gear.

SUMMARY OF THE INVENTION

This object is achieved in accordance with the invention in that the plurality of spacers are designed as tabs of one, first bearing plate, which are bent by 90° from the plane of the first bearing plate and comprise at least one lateral projection, and the tabs are inserted with their free tab ends into plug-in openings of the other second bearing plate without play until their at least one lateral projection rests against the second bearing plate.

According to the invention, the connecting elements are formed in one piece with the first bearing plate. As a result of the fact that a smaller number of individual parts has to be processed during assembly and disassembly, the construction of the regulating flap reduction gear is simplified. Moreover, the tabs have good stability since they are produced to have the same thickness as the first bearing plate. The two bearing plates are preferably produced from metal and are a stamped part or a laser cut in each case (further feasible production methods are 3D printing of metal or also metal sintering, etc.).

The at least one lateral projection preferably lies in the plane of the tab and the tabs each have a lateral projection on both sides.

The free tab ends that are inserted into the second bearing plate and/or the at least one lateral projection that rests against the second bearing plate is/are integrally connected to the second bearing plate, in particular by (laser) welding in order to permanently fix the two bearing plates and the gear parts that are arranged between them to each other.

In preferred embodiments of the invention, one of the rotary gear parts can be pivoted between two end positions and rests against one of the tabs in at least one of its two end positions, which tabs thus form a rotation stop for the pivotable gear part. The pivotable gear part preferably rests against two different tabs in each of its two end positions. Separate components are not required to realize a rotation stop such that the construction of the regulating flap reduction gear is further simplified.

Preferably, the first bearing plate comprises a bearing opening for the pivotable gear part and is reinforced around the bearing opening in the region of that or those tab(s) against which the pivotable gear part rests in its end positions. These reinforcements may be formed e.g. by two convex bulges that radially inwardly project into the bearing opening and form, together with the opposite bearing opening wall, a play-free three-point mounting for the output shaft of the regulating flap, which is accommodated in the bearing opening.

The pivotable gear part advantageously comprises two end faces that point in the direction of rotation and rest against one tab in each of the two end positions. For example, a segmented toothed wheel of the pivotable gear part may comprise these two end faces.

The pivotable gear part advantageously forms an output of the regulating flap reduction gear to which a regulating flap is fastened in a rotationally fixed manner. The regulating flap reduction gear permits very fine adjustment of the regulating flap such that the desired position of the regulating flap can be set exactly.

Further advantages of the invention can be extracted from the description and the drawing. The features mentioned above and below may be used individually or collectively in arbitrary combination. The embodiment shown and described is not to be understood as an exhaustive enumeration but rather as having exemplary character for describing the invention.

DETAILED DESCRIPTION OF THE PREFERRED EMBODIMENTS

Figure 1:
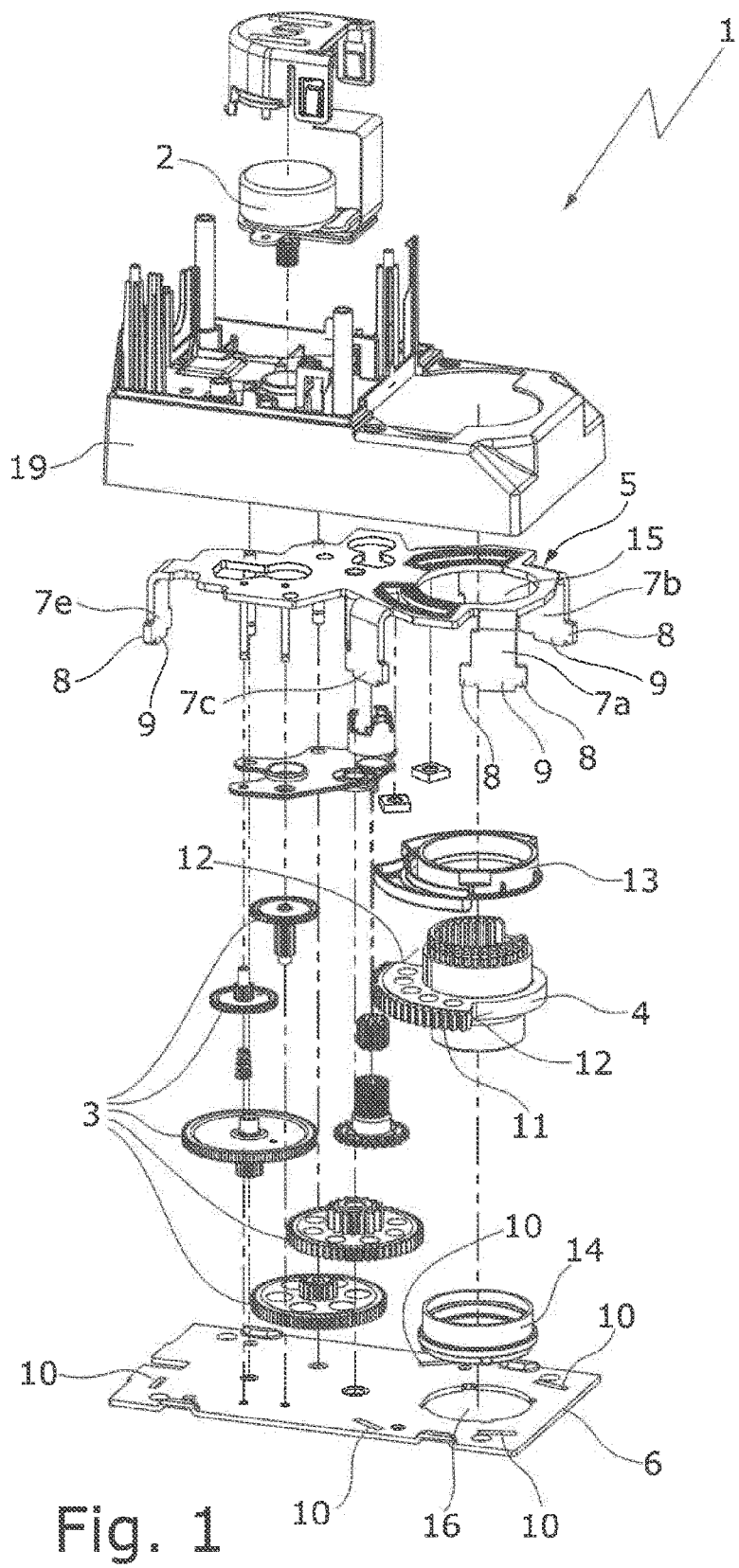
FIG. 1 shows an exploded view of an inventive regulating flap reduction gear.

The regulating flap reduction gear 1 illustrated in FIG. 1 is driven by an electric motor 2 and comprises a plurality of gear parts 3, 4 that are rotatably arranged between two parallel bearing plates 5, 6. The two bearing plates 5, 6 are preferably made of metal and are a stamped part or a laser cut in each case.

The one, upper bearing plate 5 has a plurality of tabs 7a-7e, in the present case by means of example five tabs, which are bent through 90° out of the plate plane of the upper bearing plate 5. The tabs 7a-7e have a lateral projection 8 on both sides in each case, that lies in the tab plane. In the mounted state of the reduction gear 1, the free tab ends 9 of the tabs 7a-7e are inserted in plug-in openings 10 of the other, lower bearing plate 6 with perfect fit or without play until their two lateral projections 8 rest against the lower bearing plate 6. The tabs 7a-7e thus form spacers that maintain the two bearing plates 5, 6 at a separation from each other. The free tab ends 9 inserted in the lower bearing plate 6 and/or the lateral projections 8 resting against the lower bearing plate 6 are welded to the lower bearing plate 6, in particular laser-welded in order to permanently fix the two bearing plates 5, 6 and the gear parts 3, 4 that are arranged between them to each other.

The last gear part 4 of the drive train to which a regulating flap (not shown) is fastened in a rotationally fixed manner, forms the output of the regulating flap reduction gear 1 and comprises a segmented 90° toothed wheel 11 with two end faces 12 facing in the direction of rotation. The last gear part 4 is rotatably mounted in bearing openings 15, 16 of the two bearing plates 5, 6 via an upper and a lower bearing bush 13, 14, i.e. pivotable through approximately 270° between two end positions in which the segmented toothed wheel 11 rests with its end faces 12 against the narrow sides of the two tabs 7a, 7b. The two tabs 7a, 7b thus form two rotation stops for the last gear part 4. The two tabs 7c, 7d are arranged on a larger radius than the tabs 7a, 7b around the bearing opening 15 and lie thus outside of the rotation region of the segmented toothed wheel 11.

Figure 2:
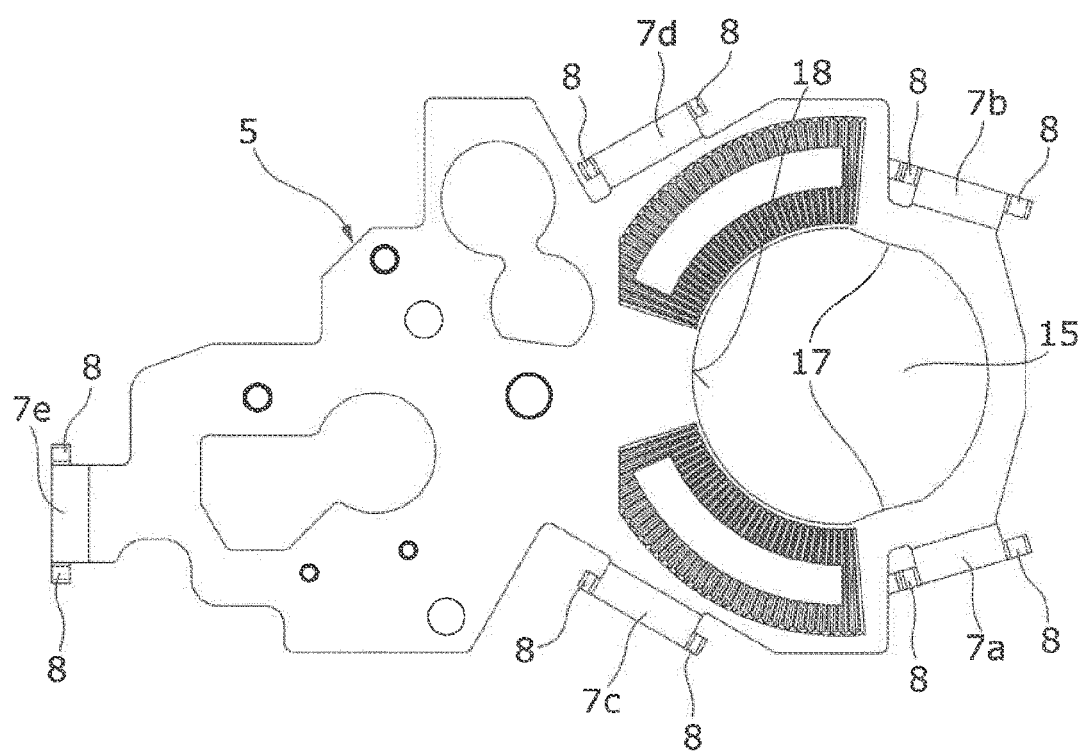
FIG. 2 shows a top view of a first bearing plate of the regulating flap reduction gear of FIG. 1.

As is shown in FIG. 2, the upper bearing plate 5 is reinforced around the bearing opening 15 in the region of the two stop-forming tabs 7a, 7b by two convex bulges 17 that radially inwardly project into the bearing opening 15 and that form, together with the opposite opening wall 18, a play-free three-point mounting for the output shaft of the regulating flap received in the bearing opening 15. By means of these bulges 17, the torques acting on the output shaft when stopping against the tabs 7a, 7b can be optimally introduced into the upper plate 5.

The regulating flap reduction gear 1 moreover comprises a cover 19 that is put onto the composite of upper and lower bearing plate 5, 6.

A reduction gear 1 of the illustrated type permits transmission of high torques of e.g. 1 Nm and more. The run times on the output shaft may be 0.5 seconds per 90° or more. The two end positions of the last gear part 4, which are defined by the tabs 7a, 7b, can e.g. correspond to the closed and completely open flap position of the regulating flap in the flow channel.

What is claimed is:

1. A regulating flap reduction gear for an electrically driven regulating flap for regulating a gas or liquid volume flow, comprising:
   two parallel bearing plates, being a first bearing plate and a second bearing plate, between which rotary gear parts are rotatably arranged; and
   a plurality of spacers which keep the two parallel bearing plates at a distance from one another;
   wherein the plurality of spacers are designed as tabs of one, the first bearing plate, which are bent by 90° from the plane of the first bearing plate and comprise at least one lateral projection, and the tabs are inserted with their free tab ends into plug-in openings of the second bearing plate until their at least one lateral projection rests against the second bearing plate; and
   wherein one of the rotary gear parts is a pivotable gear part that can be pivoted between two end positions and rests against one of the tabs in at least one of its two end positions, the first bearing plate comprises a bearing opening for the pivotable gear part and is reinforced around the bearing opening in a region of that tab against which the pivotable gear part rests in its end position, and the first bearing plate is reinforced, in a region of that tab against which the pivotable gear part rests, by a bulge that radially inwardly projects into the bearing opening.

2. The regulating flap reduction gear according to claim 1, wherein the at least one lateral projection lies in the plane of the tab.

3. The regulating flap reduction gear according to claim 2, wherein the tabs each have a lateral projection on both sides.

4. The regulating flap reduction gear according to claim 1, wherein the tabs each have a lateral projection on both sides.

5. The regulating flap reduction gear according to claim 1, wherein the free tab ends that are inserted into the second bearing plate and/or the at least one lateral projection that rests against the second bearing plate is/are integrally connected to the second bearing plate, in particular by welding.

6. The regulating flap reduction gear according to claim 1, wherein in each of its two end positions, the pivotable gear part rests against two different tabs.

7. The regulating flap reduction gear according to claim 1, wherein the pivotable gear part comprises two end faces that point in the direction of rotation and rest against one tab in each of the two end positions.

8. The regulating flap reduction gear according to claim 7, wherein the two end faces are provided on a segmented toothed wheel of the pivotable gear part.

9. The regulating flap reduction gear according to claim 1, wherein the pivotable gear part forms an output of the regulating flap reduction gear to which a regulating flap is fastened in a rotationally fixed manner.

10. The regulating flap reduction gear according to claim 1, wherein the first and/or the second bearing plate is/are formed from metal.

11. The regulating flap reduction gear according to claim 1, wherein the first and/or the second bearing plate is/are a stamped part, a laser cut, a 3D printed metal part or a sintered part.

12. The regulating flap reduction gear according to claim 1, wherein the regulating flap reduction gear is configured for the field of heating, ventilation, air conditioning, fire protection and/or smoke protection.

\* \* \* \* \*